US009104515B2

(12) United States Patent
Tomono et al.

(10) Patent No.: US 9,104,515 B2
(45) Date of Patent: Aug. 11, 2015

(54) FLOATING-POINT ERROR DETECTION AND CORRECTION

(71) Applicant: FUJITSU LIMITED, Kawasaki-shi, Kanagawa (JP)

(72) Inventors: Mitsuru Tomono, San Jose, CA (US); Hiroaki Yoshida, Cupertino, CA (US); Soseki Aniya, Higashi-Hiroshima (JP)

(73) Assignee: FUJITSU LIMITED, Kawasaki (JP)

( * ) Notice: Subject to any disclaimer, the term of this patent is extended or adjusted under 35 U.S.C. 154(b) by 325 days.

(21) Appl. No.: 13/715,707

(22) Filed: Dec. 14, 2012

(65) Prior Publication Data

US 2014/0172936 A1     Jun. 19, 2014

(51) Int. Cl.
*G06F 7/499*     (2006.01)
*G06F 7/60*      (2006.01)
*G06F 7/485*     (2006.01)
*G06F 9/30*      (2006.01)

(52) U.S. Cl.
CPC ........ *G06F 7/60* (2013.01); *G06F 7/485* (2013.01); *G06F 7/499* (2013.01); *G06F 9/3001* (2013.01)

(58) Field of Classification Search
CPC ...................................................... G06F 7/483
USPC ................... 708/505, 495–498, 550–553
See application file for complete search history.

(56) References Cited

U.S. PATENT DOCUMENTS

| 3,389,379 | A | * | 6/1968 | Erickson | .......................... 341/75 |
| 5,257,216 | A | * | 10/1993 | Sweedler | ....................... 708/498 |
| 5,884,062 | A | * | 3/1999 | Wichman et al. | ............. 712/218 |
| 5,940,311 | A | * | 8/1999 | Dao et al. | ....................... 708/204 |

OTHER PUBLICATIONS

Wikipedia, Streaming SIMD Extensions, Jul. 1, 2010, pp. 1-4.*
Benz et al., "A Dynamic Program Analysis to find Floating-Point Accuracy Problems", PLDI Jun. 2012 Proceedings of the 33rd ACM SIGPLAN conference on Programming Language Design, vol. 47 Issue 6, pp. 453-462.
Lam et al., "Dynamic Floating-Point Cancellation Detection", WHIST 2011.

* cited by examiner

*Primary Examiner* — Chuong D Ngo
*Assistant Examiner* — Calvin M Brien
(74) *Attorney, Agent, or Firm* — Maschoff Brennan

(57) ABSTRACT

An embodiment includes a method for detecting a potential floating-point error in an addition or a subtraction instruction included in an operation. The method may include identifying a first operand and a second operand. The first operand and the second operand may be configured to be manipulated during execution of the instruction. The method may include copying a first exponent of the first operand to a first comparison register. The method may also include copying a second exponent of the second operand to a second comparison register. The method may further include comparing the first exponent in the first comparison register to the second exponent in the second comparison register. Based on the comparison, a determination may be made whether the instruction includes a potential floating-point error when executing the instruction using the first operand and the second operand formatted according to a first precision.

20 Claims, 6 Drawing Sheets

FLOATING-POINT ERROR DETECTION AND CORRECTION

FIELD

The embodiments discussed herein are related to performing computer-based calculations.

BACKGROUND

Calculations performed by computing devices involve operands. The term "operands" refers to numbers, which are manipulated in the calculation. To be introduced to the computing devices, the operands are converted to binary forms, which approximate the value of the operands. For example, one standard equation in which operands may be represented is:

$$X = \pm s \times f^e$$

In the foregoing equation, X represents the operand, s represents mantissa, f represents a base, and e represents an exponent. Operands formatted according to the standard equation above may be represented in binary forms by a specific sequence of 1's and 0's (bits). The sequence of a binary form may include a designation that a specific bit is part of an exponent or a mantissa of an operand by its place within the sequence. The sequence is generally known by a program or processor performing the calculation, thus when operands are converted to a binary form they may be received, understood, and/or used in calculations by the program or processor.

The binary form of operands includes a characteristic called precision. Generally, the term precision refers to a maximum number of digits that may be represented with the mantissa of an operand. While, higher precision binary forms may result in a closer approximation of an operand, because binary representations use only a finite number of bits, the binary forms are usually an approximation of the operand. Thus, some floating-point errors may be introduced into a calculation due to the inaccuracies between an operand and a binary form thereof.

The subject matter claimed herein is not limited to embodiments that solve any disadvantages or that operate only in environments such as those described above. Rather, this background is only provided to illustrate one example technology area where some embodiments described herein may be practiced.

SUMMARY

An embodiment includes a method for detecting a potential floating-point error in an addition or a subtraction instruction included in an operation. The method may include identifying a first operand and a second operand. The first operand and the second operand may be configured to be manipulated during execution of the instruction. The method may include copying a first exponent of the first operand to a first comparison register. The method may also include copying a second exponent of the second operand to a second comparison register. The method may further include comparing the first exponent in the first comparison register to the second exponent in the second comparison register. Based on the comparison, a determination may be made whether the instruction includes a potential floating-point error when executing the instruction using the first operand and the second operand formatted according to a first precision.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
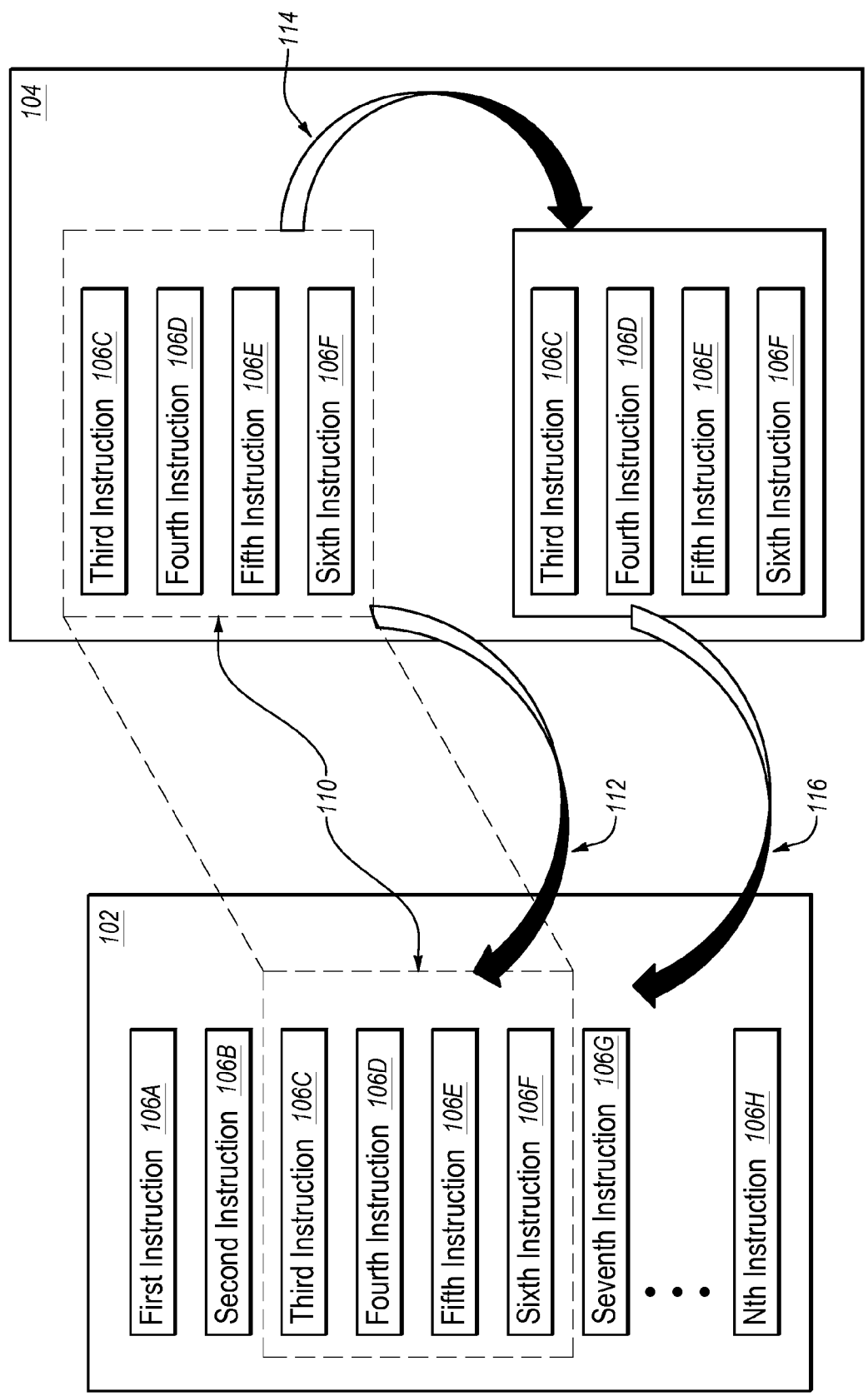
FIG. 1 illustrates an example interface between an example original program and an example detection/correction program.

Operands manipulated during execution of computer instructions may be represented in binary forms by a specific sequence of 1's and 0's (bits). When operands are converted to a binary form they may be received, understood, and/or used in calculations by a program or a processor. Because binary fortes represent operands using only a finite number of bits, the binary forms are usually an approximation of the operand. Thus, some floating-point errors may be introduced into a calculation due to the inaccuracies between an operand and a binary form thereof.

Floating-point errors may include cancellations and loss of trailing digit errors. These floating-point errors may occur when operands are close in value or when operands are significantly different and the operands are involved in an addition or subtraction calculation. In some calculations, the floating-point errors do not affect the result. Thus, a binary form of the operands is accurate enough for the calculation. However in some calculations, the floating-point errors may be introduced into a calculation that may significantly affect the result. Additionally, in some calculations, the floating-point errors may accumulate through a series of calculations, which may lead to inaccurate results. For example, a catastrophic cancellation may occur when operands having nearby quantities are subtracted or added. One of the operands may be subject to rounding, thus losing a significant value during performance of the calculation. The floating-point error may be carried through to subsequent calculations and affect the subsequent calculations. Generally, by increasing the precision of the operands involved in a calculation, the approximation embodied by the binary form is more accurate, which may reduce or avoid the floating-point errors such as cancellations.

One embodiment described herein includes a method of detecting and correcting potential floating-point errors in an addition or a subtraction calculation. As stated above, floating-point errors may occur when operands are close in value or significantly different. The relationship between the values of the operands may be indicated by comparing exponents of the operands. Accordingly, the method may include receiving an instruction included in a program. A first exponent of a first operand of the instruction may be copied into a first register and a second exponent of a second operand of the instruction may be copied into a second register. The first exponent may be compared to the second exponent to generate an exponent comparison. When the exponent comparison is above a first preselected threshold or below a second preselected threshold, a potential floating-point error may be introduced by execution of the instruction in the program. To reduce a chance of introducing a floating-point error, a result of the instruction may be calculated using the first operand formatted according to an increased precision and the second operand formatted according to the increased precision. The result of the instruction calculated using the operands formatted according to the increased precision may be used by the program when executing other instructions. This method may thus reduce floating-point errors that may occur in the original program. Additional embodiments of the present invention will be explained with reference to the accompanying drawings.

FIG. 1 illustrates an example interface between an example original program 102 and an example detection/correction program 104, arranged in accordance with at least some embodiments described herein. Generally, the original program 102 may be a computer program that through execution of multiple instructions 106A-106H (generally, instruction 106 or instructions 106), generates an output. For example, the original program 102 may include a series of arithmetic operations that combine to calculate the output. In this example, each of the series of arithmetic operations may be one of the instructions 106. Note that the original program 102 depicted in FIG. 1 includes eight instructions 106. However, this depiction is not meant to be limiting. Inclusion of an Nth instruction 106H and an ellipse are meant to indicate that the original program 102 may include more than eight instructions 106.

Executing each of the instructions 106 in low precision (e.g., 8-bit precision, 16-bit precision, and/or 32-bit precision) may increase the efficiency of the original program 102, because relatively low overhead may be involved in executing the instructions 106 in low precision. However, use of low precision during execution of the instructions 106 may introduce into the original program 102 floating-point errors such as cancellations or loss of trailing digit errors do to round off errors, truncations, etc.

The detection/correction program 104 may be configured to detect potential floating-point errors that may occur during execution of one or more of the instructions 106 of the original program 102. Generally, the detection/correction program 104 may be an independent computer program that interfaces with the original program 102 or may be a subroutine configured to run in concert with the original program 102.

The detection/correction program 104 analyzes a subset of the instructions 106 together. The subset of instructions 106 is referred to herein as a window 110. When the detection/correction program 104 detects a potential floating-point error in one of the instructions 106 included in the window 110, the detection/correction program 104 may be configured to execute the instructions 106 included in the window 110 at a higher precision to correct the potential floating-point error. In FIG. 1, an arrow labeled 114 represents the detection/correction program 104 executing the instructions 106 included in the window 110 at a higher precision.

After executing the instructions 106 included in the window 110 at a higher precision, the detection/correction program 104 may then communicate a value produced from the execution of the instructions 106 with a higher precision to the original program 102. In FIG. 1, an arrow labeled 116 represents the detection/correction program 104 communicating the value produced from executing the instructions 106 included in the window 110 with the higher precision to the original program 102. In the original program 102, rather than using a value resulting from the execution of the instructions 106 in which a potential floating-point error is detected, the original program 102 uses the value communicated by the detection/correction program 104 when executing subsequent instructions 106.

For example, the window 110 includes a third instruction 106C, a fourth instruction 106D, a fifth instruction 106E, and a sixth instruction 106F. If the detection/correction program 104 detects a potential floating-point error in the third instruction 106C, then the detection/correction program 104 may be configured to execute the third, fourth, fifth and sixth instructions 106A-106F at a higher precision. The detection/correction program 104 may then communicate a value resulting from execution of the third, fourth, fifth and sixth instructions 106A-106F to the original program 102. The original program 102 uses the value communicated from the detection/correction program 104 in subsequent instructions 106 (e.g., a seventh instruction 106G through the Nth instruction 106H).

Alternatively, the detection/correction program 104 may simple detect a potential floating-point error and not execute the instructions 106 included in the window 110. Instead, the detection/correction program 104 may direct the original program 102 to execute the instructions 106 included in the window 110 at a higher precision. In FIG. 1, the arrow labeled 112 is meant to represent the detection/correction program 104 directing the original program 102 to execute the instructions 106 included in the window 110 at a higher precision.

For example, if a potential floating-point error was detected in the third instruction 106C in the window 110, then the detection/correction program 104 may direct the original program 102 to execute the third, fourth, fifth and sixth instructions 106A-106F using a higher precision.

A number of instructions 106 included in the window 110 may be determined by defining a window size. For example, in the window 110 depicted in FIG. 1, the window size is defined such that the window 110 includes four of the instructions 106. The four instructions 106 included in the window 110 may be analyzed together in the detection/correction program 104. The window size may be adjusted to modify the number of instructions 106 that may be included in the window 110. Adjusting the window size may increase or decrease the number of instructions 106 included in the window 110 and may accordingly affect the speed of and/or overhead used by the detection/correction program 104 as well as the probability that a potential floating-point error is detected.

For example, in some original programs 102, a window size including four instructions 106 may be sufficient to detect potential floating-point errors. However, to increase the probability that potential floating-point errors are detected, the window size may be increased. Generally, the larger the window size, the better the detection/correction program 104 may be at detecting potential floating-point errors. However, increasing the window size may also decrease the rate at which each window 110 of instructions 106 is analyzed and/or increase the overhead involved in running the detection/correction program 104. Thus, the window size may generally affect the speed, the efficiency of, and the probability of detecting potential floating-point errors by the detection/correction program 104.

In operation, the detection/correction program 104 sequentially analyzes the instructions 106 included in the original program 102. More specifically, the detection/correction program 104 analyzes all of or most of the instructions 106 of the original program 102 one window 110 at a time. As the original program 102 proceeds through each of the instructions 106, operands included in the instructions 106 are analyzed one window 110 at a time. For example, the detection/correction program 104 with the window 110 defined as in FIG. 1, receives a first window 110 of four instructions 106. The detection/correction program 104 analyzes the first window 110. The detection/correction program 104 then receives a next window 110 including the next four instructions 106, etc.

The detection/correction program 104 analyzes each window 110 of instructions 106 together. If during the analysis of any window 110, a potential floating-point error is not detected, the detection/correction program 104 continues the analysis of the next window 110. The original program 102 carries out the window 110 of instructions 106 using the operands formatted in a low precision.

If however, a potential floating-point error is detected in the window 110, the detection/correction program 104 either calculates a value by executing the instructions 106 included in the window 110 using operands formatted in a higher precision or directs the original program 102 to execute the instructions 106 included in the window 110 using operands formatted in a higher precision.

In some embodiments in which the detection/correction program 104 calculates the value using a higher precision, the detection/correction program 104 may convert the value from the higher precision to the lower precision, prior to communicating the value formatted in the lower precision to the original program 102. The original program 102 may then incorporate the value by executing further instructions 106 using the lower precision value generated by the detection/correction program 104.

For example, the original program 102 may execute the instructions 106 using 32-bit operands. When a potential floating-point error is detected in at least one of the instructions 106 included in the window 110, the instructions 106 in the window 110 that include the potential floating-point error are executed using 64-bit operands. The instruction 106 with the potential floating-point error and the other instructions 106 in the window 110 are executed to obtain a value that reduces the possibility of introducing a floating-point error into the original program 102. The value calculated by the detection/correction program 104 has 64-bit precision. The value may be converted to 32-bit precision and communicated to the original program 102. Use of 32-bit and 64-bit precisions is not meant to be limiting. Embodiments may include executing instructions at various levels of precision including but not limited to 32-bit, 64-bit, 80-bit, 128-bit, etc.

Figure 2:
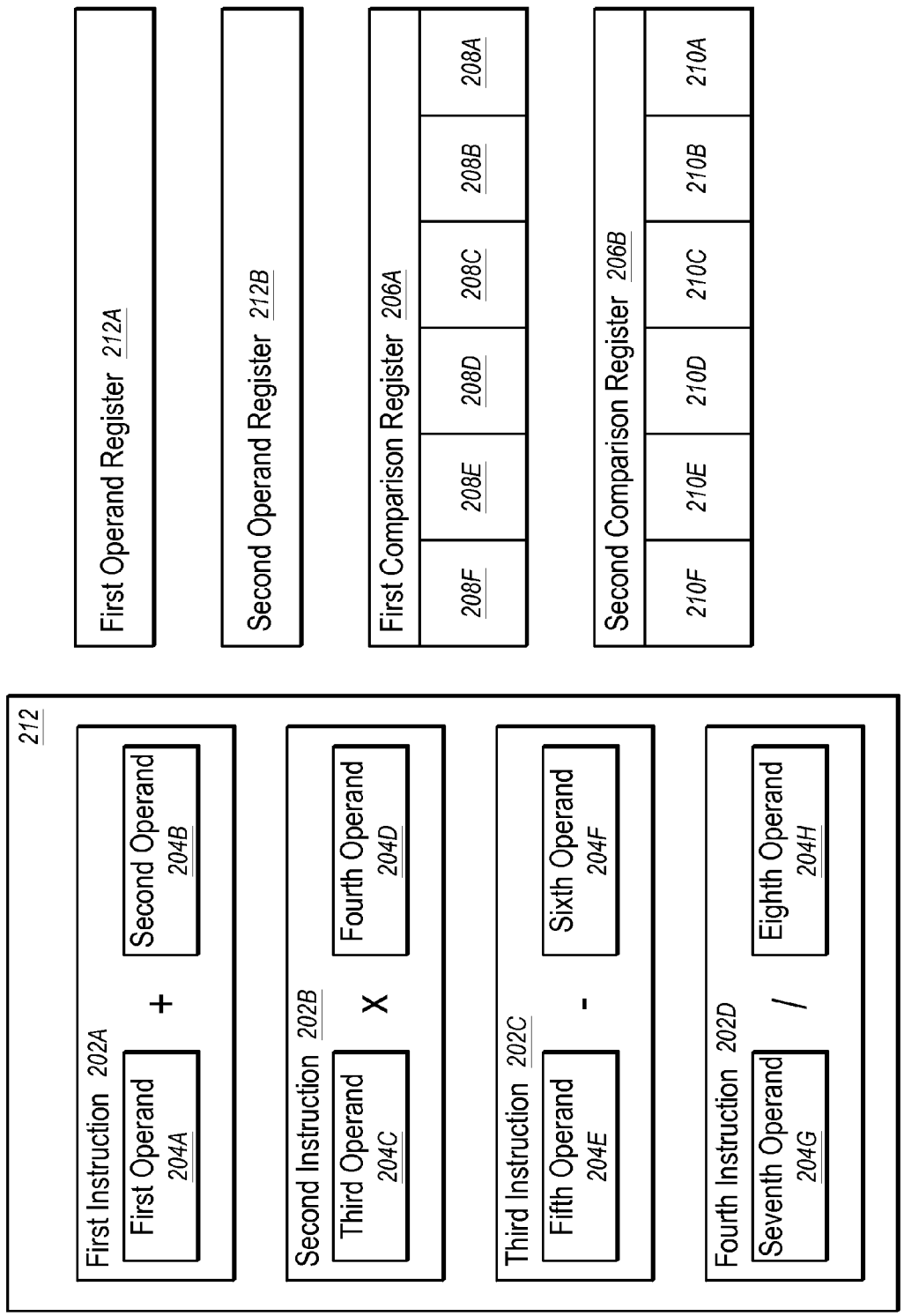
FIG. 2 is a block diagram illustrating an example analysis performed by a detection/correction program.

To detect potential floating-point errors, the detection/correction program 104 may be configured to perform an analysis of exponents of operands included in the instructions 106. FIG. 2 is a block diagram illustrating an example analysis performed by a detection/correction program, arranged in accordance with at least some embodiments described herein. In FIG. 2, the window 212 includes first, second, third, and fourth instructions 202A-202D (generally, instruction 202 or instructions 202) from an original program, such as the original program 102 of FIG. 1. The instructions 202 and the window 212 may be substantially similar to and/or correspond to the instructions 106 and the window 110 respectively, discussed above with reference to FIG. 1.

Each of the instructions 202 includes at least two operands 204A-204H (generally, operand 204 or operands 204). The operands 204 are formatted according to a binary form that includes a precision. The binary form generally includes at least a set of bits that represent an exponent of the operand 204 and a second set of bits that represent a mantissa of the operand 204. Based on the particular binary form and the precision included therein, the number of bits that represent the mantissa and the exponent of the operand 204 may increase or decrease. For example, in Half IEEE 754-2008 format, bits 1-5 may represent the exponent and bits 6-15 may represent the mantissa while in Single IEEE 754-2008, bits 1-8 may represent the exponent and bits 9-31 may represent the mantissa.

In the window 212, the instructions 202 that include either an addition or a subtraction calculation may be subject to potential floating-point errors. Accordingly, a detection/correction program, similar to the detection/correction program 104 of FIG. 1, may be configured to detect potential floating-point errors in the instructions 202 that execute addition or subtraction calculation, but may not be configured to detect potential floating-point errors in the instructions 202 that execute other types of calculations. For example, in FIG. 2, the first instruction 202A and the third instruction 202C include an addition or subtraction calculation while the second instruction 202B and the fourth instruction 202D do not.

Generally, to detect potential floating-point errors, as each of the instructions 202 are being executed, the operands 204 of the instruction 202 may be entered into an operand register 212A or 212B. The operand registers 212A and 212B may be included in an arithmetic logic unit (ALU), for instance. When the instruction 202 executes an addition or a subtraction calculation, the exponents of the operands 204 are copied into one of two comparison registries 206A and 206B. An example of the comparison registries 206A and 206B may be streaming single instruction multiple data extension (SSE) registries. The exponents copied to the comparison registries 206A and 206B are then compared to generate an exponent comparison. From the exponent comparison, it may be determined whether a potential floating-point error is present.

For example, an exponent of a first operand 204A is copied to a first comparison register 206A and an exponent of a second operand 204B is copied to a second comparison register 206B. The exponents from the first and second operands 204A, 204B may then be compared to generate the exponent comparison. Whether a potential floating-point error is present may be determined from the exponent comparison.

In some embodiments, to determine whether a potential floating-point error may be present, the exponent comparison may be compared to a first preselected threshold and/or a second preselected threshold. In these and other embodiments, the exponent comparison may include a difference between the exponents. For example, the first exponent may be subtracted from the second exponent, or vice versa, to generate the exponent comparison. A potential floating-point error may be indicated in one of the instructions 202 when the exponent comparison is above the first preselected threshold or below the second preselected threshold. That is, floating-point errors generally occur when the operands 204 are close in value, for example when a difference between exponents of two operands is less than 2. As another example, the operands 204 may be considered close in value when the difference between exponents of two operands is less than 1, less than 3, or some other value. Floating-point errors may also occur when there is a large difference between the operands 204. A large difference between the operands 204 may depend on the available precision for the operands. For example, when the original program 102 has an available precision of 64 bits, a large difference between the exponents of two operands may be greater than 50, 52, 54 or some other difference. As another example, when the original program 102 has an available precision of 32 bits, a large difference between the exponents of two operands may be greater than 24, 26, 28 or some other difference.

Thus, when the difference between the exponents of the operands 204 is very large or very small a potential floating-point error is indicated. The first preselected threshold and/or the second preselected threshold may be set or automatically set based on the type program for which floating-point errors are being detected, the precision of the operands in the program for which floating-point errors are being detected, the window size, set by a user, or otherwise defined.

In some embodiment, the comparison registers 206A and 206B may include multiple positions 208A-208F and 210A-210F (generally, position 208/210 or positions 208/210). The positions 208/210 may enable multiple comparisons of multiple exponents copied from multiple instructions 202 to be performed in parallel. In FIG. 2, a first comparison register 206A includes six positions labeled 208A-208F and a second comparison register 206B includes six positions labeled 210A-210F. Note that the comparison registers 206A and 206B may include more than six positions 208/210 or fewer than six positions 208/210 in some embodiments.

FIG. 2 includes the window 212 in which a parallel comparison may occur. Specifically, the exponents from the operands 204 of the first instruction 202A and the third instruction 202C, which include an addition or a subtraction calculation, may be compared in parallel to determine whether a potential floating-point error is present in the first instruction 202A and/or the third instruction 202C. More specifically, an exponent of the first operand 204A may be copied to a first position 208A of the first comparison register 206A. An exponent of the second operand 204B may be copied to a first position 210A of the second comparison register 206A. An exponent of a fifth operand 204E may be copied to a second position 208B of the first comparison register 206A and an exponent of a sixth operand 204F may be copied to a second position 210B of a second comparison register 206B. A comparison between the exponent of the first operand 204A and the exponent of the second operand 204B may be performed in parallel with a comparison between the exponent of the fifth operand 204E and the exponent of the sixth operand 204F. In parallel comparisons, indications of potential floating-point errors may be substantially similar to the indications described above when two exponents are compared, i.e. a generated exponent comparison above or below one or more preselected thresholds.

In this example, two comparisons of exponents from two instructions 202 are performed in parallel. However, this depiction is not meant to be limiting. In some embodiments, more than two comparisons may occur in parallel. Indeed, the number of comparisons that may be performed in parallel may be limited by a processor performing the comparison. Additionally, in some embodiments, the comparison may be performed by a single instruction multiple data (SIMD) instruction. In embodiments including the SIMD instruction, one instruction is executed that performs the parallel comparisons of multiple sets of exponents as described above.

Generally, detecting potential floating-point errors in the above-described parallelized operation occurs independently using a single instruction. Thus, the presence of a potential floating-point error in a first instruction may have little or no bearing on a determination made with respect to any other instruction 202 including a potentially floating-point error.

When the exponent comparison discussed above indicates a potential floating-point error, the instructions 202 included in the window 212 are executed at a higher precision either at a detection/correction program or at an original program. More specifically, the operands 204 included in the instructions 202 in which a potential floating-point error is detected are reformatted into a second precision with increased number of bits representing the mantissa and/or the exponent. All the instructions 202 included in the window 212 are then executed to generate a value.

In embodiments in which the detection/correction program executes the instructions 202, the value is then converted to a lower precision and communicated to an original program that includes the instructions 202. Executing the instructions 202 included in the window 212 with some of operands 204 formatted according to the second precision may avoid cancellations or other floating-point errors.

A processing device executing the original program may benefit from the detection/correction program described herein due to an overall reduction in potential floating-point errors without devoting unnecessary overhead to execute all addition and subtraction calculations using a higher precision. That is, only when a potential floating-point error is detected does the detection/correction program or the original program execute the instructions 202 using the higher precision. Thus, detecting the floating-point errors involves less overhead than the overhead involved in executing the instruction 202 using the operands 204 formatted in the higher precision.

Figure 3:
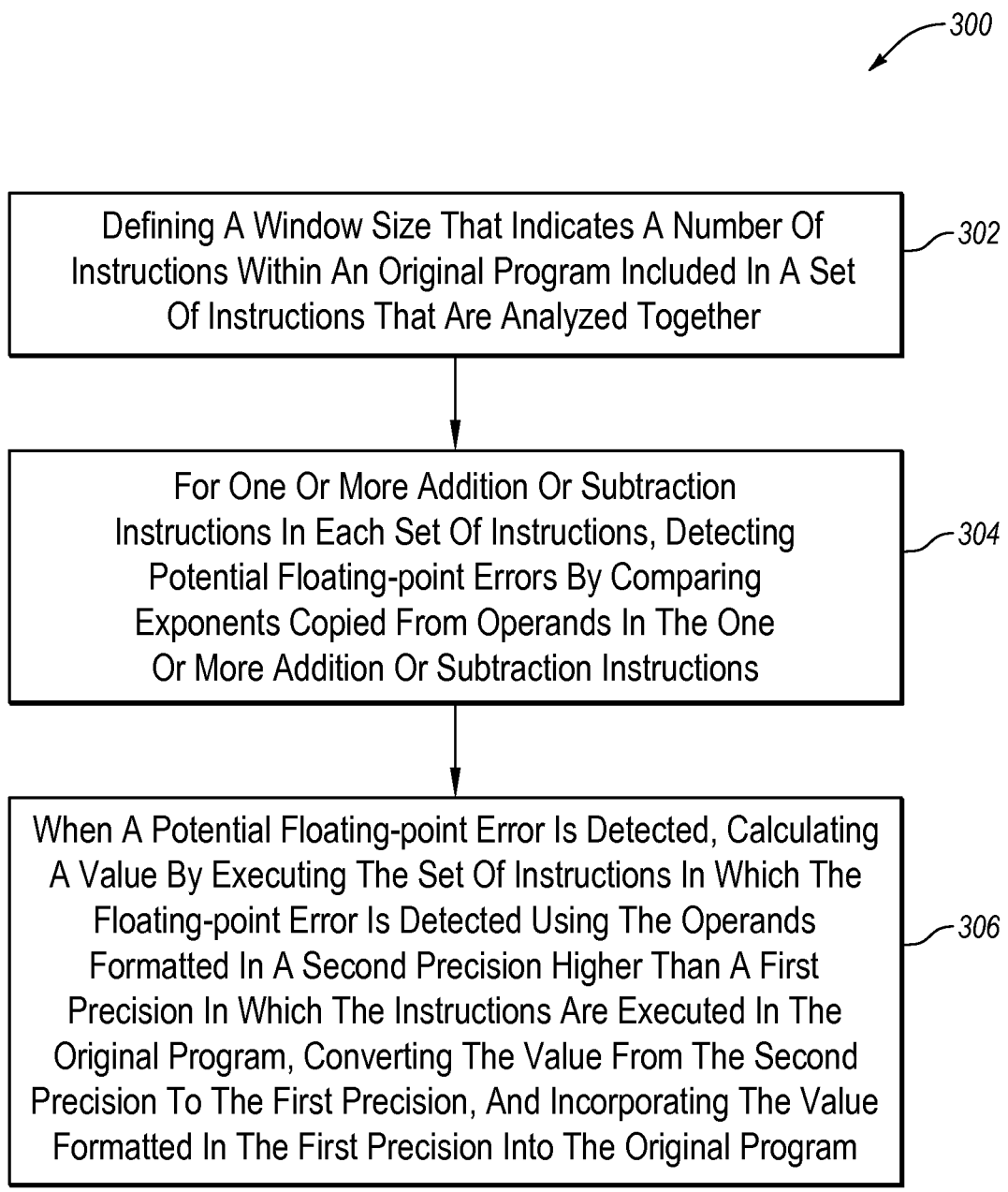
FIG. 3 is a flow chart of an example method for correcting potential floating-point errors.

FIG. 3 is a flow chart of an example method 300 for correcting potential floating-point errors, arranged in accordance with at least some embodiments described herein. The method 300 may be implemented, in some embodiments, by a system, such as a processing system 600 configured to detect potential floating-point errors of FIG. 6. Although illustrated as discrete blocks, various blocks may be divided into additional blocks, combined into fewer blocks, or eliminated, depending on the desired implementation. The method 300 may begin at 302 by defining a window size that indicates a number of instructions within an original program included in a set of instructions that may be analyzed together.

At 304, for one or more addition or subtraction instructions in each set of instructions, potential floating-point errors may be detected. Detecting potential floating-point errors may include comparing exponents copied from operands in the one or more addition or subtraction instructions.

Additionally or alternatively, detecting the potential floating-point errors may include copying the exponents into one of two comparison registries and performing a comparison operation between the two comparison registries. The performance of the comparison operation may be a parallelized operation in which the exponents from a multiple operands are compared independently using a single instruction.

At 306, when the potential floating-point error is detected, a value may be calculated by executing the set of instructions in which the floating-point error is detected using the operands formatted in a second precision higher than the first precision, converting the value from the second precision to the first precision, and incorporating the value formatted in the first precision into the original program. In some embodiments, detecting the floating-point errors may involve less overhead than the overhead involved in executing the instruction using the operands formatted in the second-higher precision. In some embodiments, the first precision includes a 32-bit precision and the second precision includes a 64-bit precision.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instances, the method 300 may further include adjusting the window size to modify the number of instructions included in each set of instructions.

Figure 4:
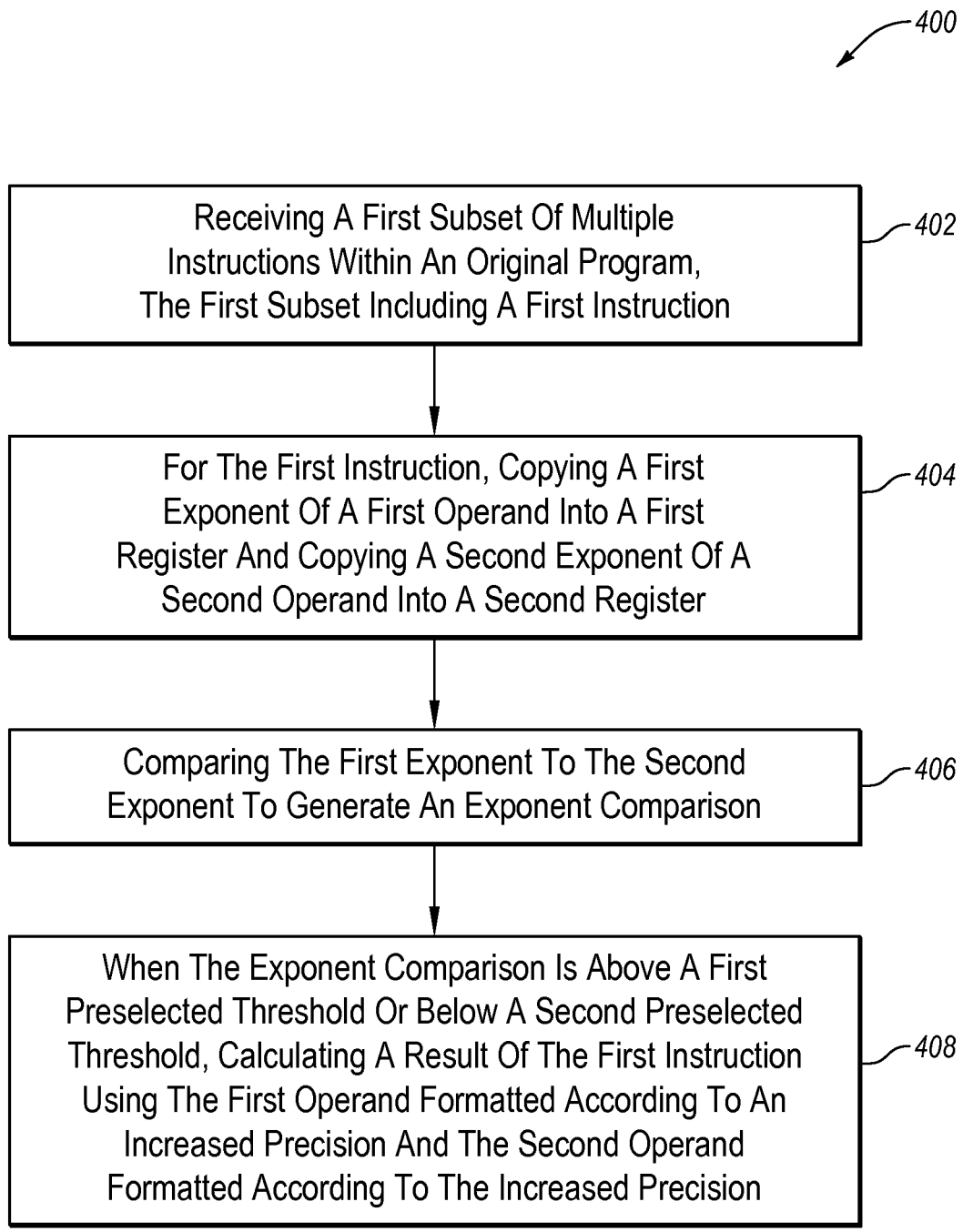
FIG. 4 is a flow chart of another example method for correcting potential floating-point errors.

FIG. 4 is a flow chart of another example method 400 for correcting potential floating-point errors, arrange in accordance with at least some embodiments described herein. The method 400 may be implemented, in some embodiments, by a system, such as the processing system 600 configured to detect potential floating-point errors of FIG. 6. Although illustrated as discrete blocks, various blocks may be divided into additional blocks, combined into fewer blocks, or eliminated, depending on the desired implementation.

The method 400 may begin at 402 by receiving a first subset of multiple instructions within an original program, the first subset including a first instruction. The first subset may be one of multiple subsets of the multiple instructions. Each of the subsets may include a number of instructions based on a window size. The instructions included within each of the subsets may be analyzed together. In some embodiments, the method 400 may also include adjusting the window size to increase or decrease the number of instructions to be analyzed together.

At 404, for the first instruction, a first exponent of a first operand may be copied into a register and a second exponent of a second operand may be copied into a second register.

At 406, the first exponent may be compared to the second exponent to generate an exponent comparison.

At 408, when the exponent comparison is above a first preselected threshold or below a second preselected threshold, a result of the first instruction may be calculated using the first operand formatted according to an increased precision and the second operand formatted according to the increased precision. For example, the exponent comparison may be a difference between the first exponent and the second exponent.

In some embodiments, the method 400 may also include converting to a decreased precision the result of the first instruction calculated using the first operand and the second operand formatted according to the increased precision. The result converted to the decreased precision may be communicated to the original program for incorporation with remaining instructions of the original program.

Additionally or alternatively, the comparison may be performed for multiple instructions in parallel. For example, the first subset may further include a second instruction involving a third operand and a fourth operand. The first exponent may be copied to a first position in the first register and the second exponent may be copied to a first position in the second register. For the second instruction, a third exponent of the third operand may be copied into a second position of the first register and a fourth exponent of the fourth operand may be copied into a second position of the second register. The first exponent may be compared to the second exponent and the third exponent may be compared the fourth exponent using a single instruction. In some embodiments, the first instruction and the second instruction may include an addition or a subtraction calculation.

The method 400 may be expanded to the multiple subsets of instructions. For each of the instructions that is an addition or subtraction instruction in each of the multiple subsets, the method 400 may include copying to a position in the first register an exponent from one operand and copying to a position in the second register another exponent from another operand. The position in the second register may correspond to the position in the first register for each addition or subtraction instruction.

Figure 5:
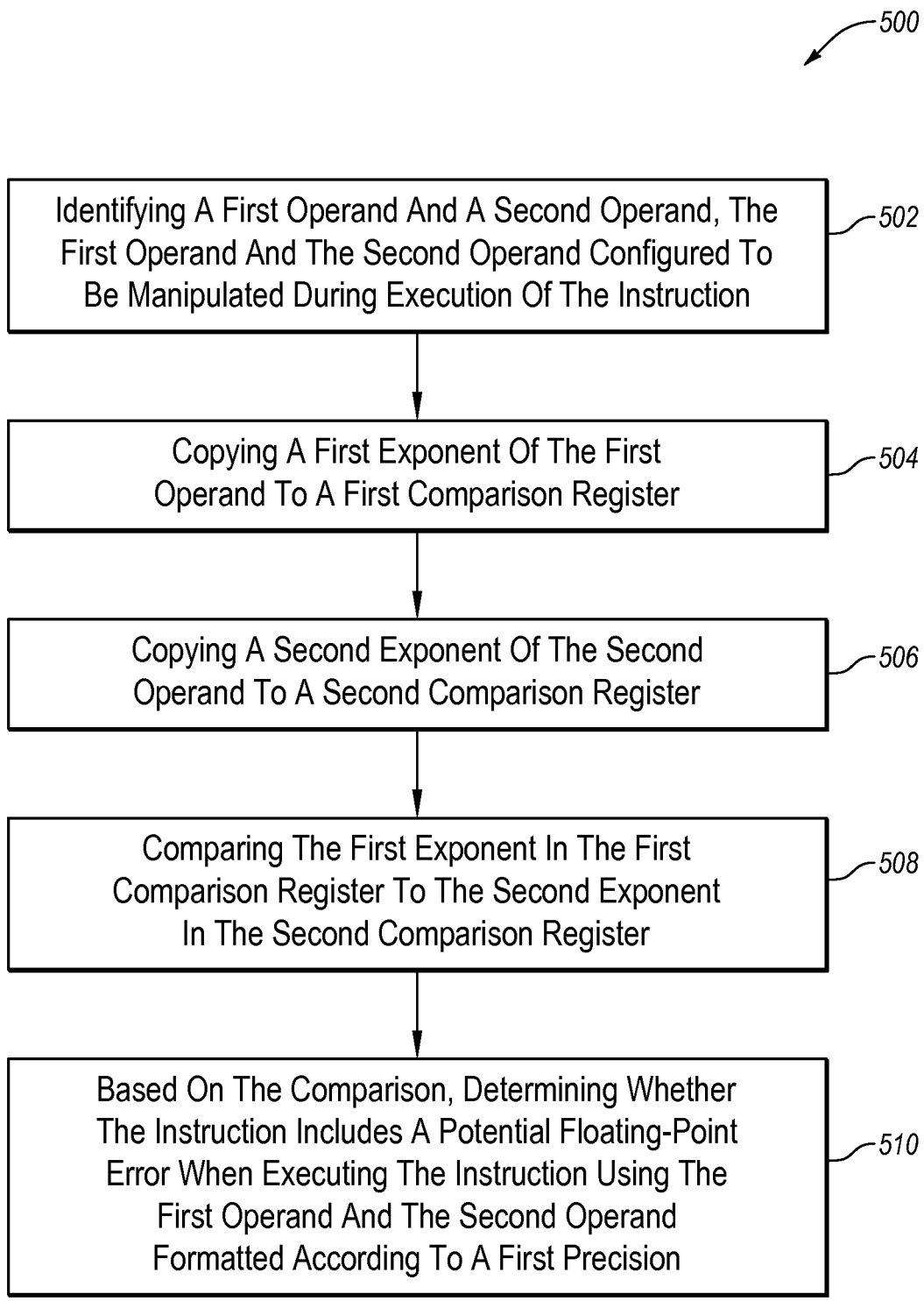
FIG. 5 is a flow chart of another example method for detecting potential floating-point errors.

FIG. 5 is a flow chart of another example method 500 for detecting a potential floating-point error, arranged in accordance with at least some embodiments described herein. The method 500 may be implemented, in some embodiments, by a system, such as the processing system 600 configured to detect potential floating-point errors of FIG. 6. Although illustrated as discrete blocks, various blocks may be divided into additional blocks, combined into fewer blocks, or eliminated, depending on the desired implementation.

The method 500 may begin at 502 by identifying a first operand and a second operand. The first operand and the second operand may be configured to be manipulated during execution of the instruction. At 504, a first exponent of the first operand may be copied to a first comparison register. In some embodiments, the first comparison register may be a streaming single instruction multiple data extension (SSE) register.

At 506, a second exponent of the second operand may be copied to a second comparison register. In some embodiments, the second comparison register may be a SSE register.

At 508, the first exponent in the first comparison register may be compared to the second exponent in the second comparison register. The comparison between the first exponent and the second exponent may include determining a difference between the first exponent and the second exponent.

At 510, based on the comparison, it may be determined whether the instruction includes a potential floating-point error when executing the instruction using the first operand and the second operand formatted according to a first precision.

Additionally or alternatively, the method 500 may include defining a first predetermined threshold and a second predetermined threshold. In these and other embodiments, when the difference is less than the first predetermined threshold or greater than the second predetermined threshold, the instruction may include a potential floating-point error. The threshold may be automatically set or set by the user.

Figure 6:
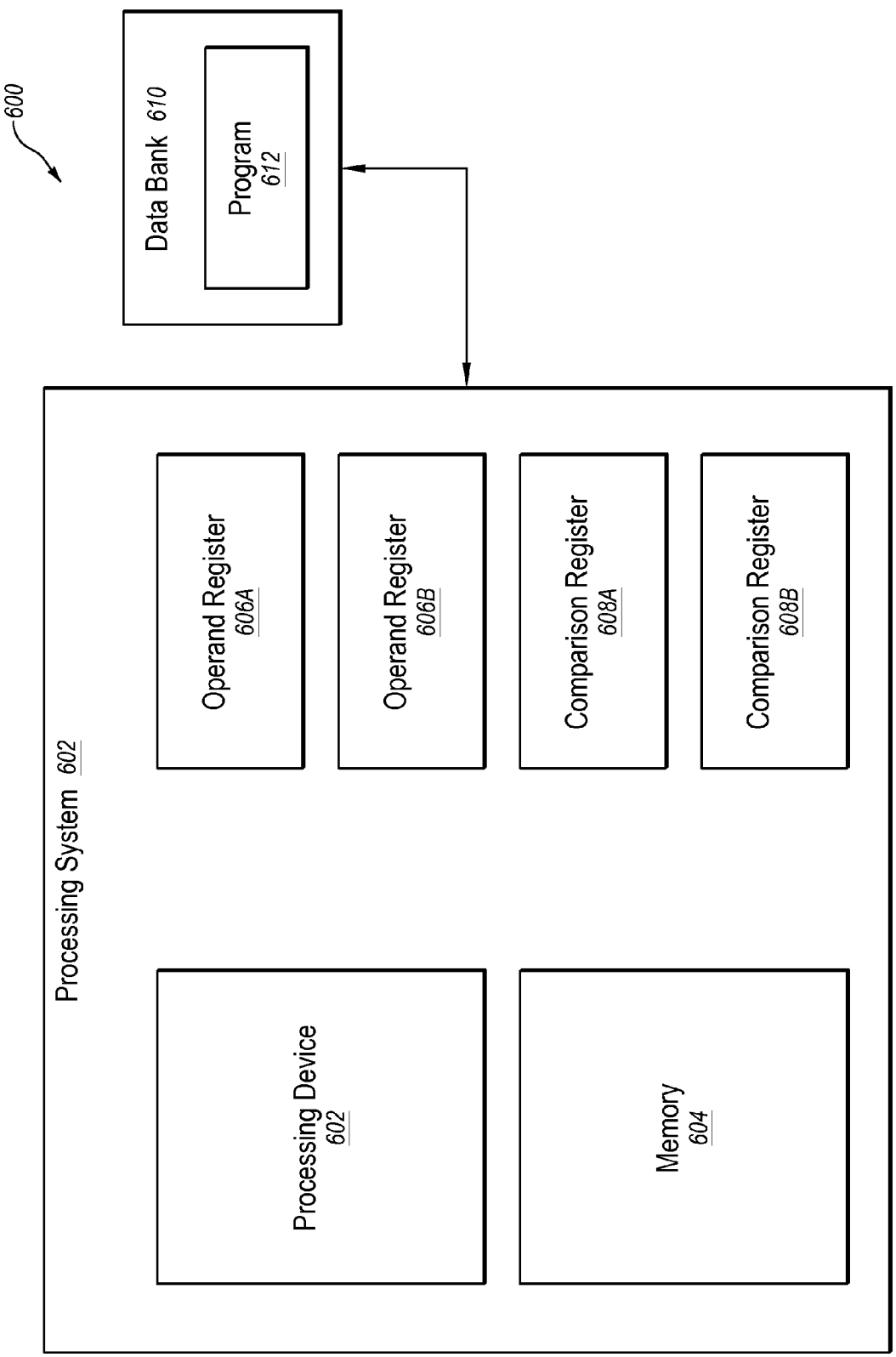
FIG. 6 is a block diagram of an example processing system configured to detect and/or correct potential floating-point errors.

FIG. 6 is a block diagram of an example processing system 600 configured to detect potential floating-point errors, arranged in accordance with at least some embodiments described herein. For example, the processing system 600 may perform one or more of the methods discussed with reference to FIG. 3, 4, or 5.

The processing system 600 may include a processing device 602 and memory 604. A memory bus (not shown) may be used for communicating between the processing device 602 and the memory 604. Depending on the desired configuration, the processing device 602 may be of any type including but not limited to a microprocessor (µP), a microcontroller (µC), a digital signal processor (DSP), or any combination thereof. In some embodiments, the processing device 602 may include one more levels of caching, a memory controller, and a processor core. The processor core may include an arithmetic logic unit (ALU), a floating-point unit (FPU), a digital signal processing core (DSP Core), or any combination thereof. The memory controller may be an internal part of processing device 602.

Depending on the desired configuration, the memory 604 may be of any type including but not limited to volatile memory (such as RAM), non-volatile memory (such as ROM, flash memory, etc.) or any combination thereof. The memory 604 may include an operating system, one or more applications, and program data. For example, the memory 604 may include an original program such as the original program 102 and/or a detection/correction program such as the detection/correction program 104 of FIG. 1. The applications may be arranged to operate with the program data on the operating system. When implemented by the processing device 602, the applications may perform one or more methods described herein.

Computer readable media including computer executable instructions may be stored on the memory 604 or provided by any means to the processing system 600 such that the processing device 602 performs operations defined in the instructions. Embodiments described herein may be implemented using computer-readable media for carrying or having computer-executable instructions or data structures stored thereon. Such computer-readable media may be any available media that may be accessed by a general purpose or special purpose computer, such as the processing system 600. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media. Any such computer storage media may be part of the processing system 600. The computer storage media may include volatile and nonvolatile, removable and non-removable media implemented in any method or technology for storage of information, such as computer readable instructions, data structures, program modules, or other data. The memory 604 is an example of computer storage media.

Computer-executable instructions include, for example, instructions and data, which cause a general purpose computer, special purpose computer, or special purpose processing device such as the processing system 600 to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The processing system 600 may also include one or more operand registers 606A and 606B and/or one or more comparison registers 608A and 608B (collectively referred to as registers 606/608). A program 612 stored on a data bank 610 may include information that is transferred to the processing system 600. The registers 606/608 are configured to store and provide access to information transferred to the processing system 600. Additionally, the registers 606/608 may receive information resulting from one or more processes performed by the processing device 602.

The processing system 600 may have additional features or functionality. The processing system 600 may include one or more interfaces (not shown) to facilitate communications between any component of the processing system 600 and any peripheral devices. Peripheral devices may include external storage media, which is another example of computer storage media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A non-transitory computer readable media including computer executable instructions configured to cause a processing device to perform operations to correct potential floating-point errors in an addition or a subtraction calculation, the operations comprising:
   receiving a first subset of a plurality of instructions within an original program, the first subset including a first instruction;
   for the first instruction, copying a first exponent of a first operand into a first register and copying a second exponent of a second operand into a second register;
   comparing the first exponent to the second exponent to generate an exponent comparison;
   based on the exponent comparison:
      calculating a result of the first instruction using the first operand formatted according to an increased precision and the second operand formatted according to the increased precision in response to the exponent comparison being above a first preselected threshold or below a second preselected threshold, the first preselected threshold being greater than and separated from the second preselected threshold; and
      calculating the result of the first instruction not using the first operand formatted according to the increased precision and the second operand formatted according to the increased precision in response to the exponent comparison being below the first preselected threshold and above the second preselected threshold.

2. The non-transitory computer readable media of claim 1, wherein the operations further comprise:
   converting to a decreased precision the result of the first instruction calculated using the first operand and the second operand formatted according to the increased precision; and
   communicating the result converted to the decreased precision to the original program for incorporation with remaining instructions of the original program.

3. The non-transitory computer readable media of claim 1, wherein the first subset is one of a plurality of subsets of the plurality of instructions, each of the plurality of subsets including a number of instructions based on a window size, the instructions within each of the plurality of subsets being analyzed together.

4. The non-transitory computer readable media of claim 3, further comprising adjusting the window size to increase or decrease the number of instructions to be analyzed together.

5. The non-transitory computer readable media of claim 1, wherein:
   the first subset further includes a second instruction involving a third operand and a fourth operand, and
   the first exponent is copied to a first position of the first register and the second exponent is copied to a first position of the second register, wherein
   the operations further comprise:
      for the second instruction, copying a third exponent of the third operand into a second position of the first register and copying a fourth exponent of the fourth operand into a second position of the second register; and
      comparing the first exponent to the second exponent and the third exponent to the fourth exponent.

6. The non-transitory computer readable media of claim 5, wherein the first instruction and the second instruction are for an addition or a subtraction calculation.

7. The non-transitory computer readable media of claim 1, wherein the potential floating-point error is indicated in the first instruction when the exponent comparison is above the first preselected threshold or below the second preselected threshold.

8. The non-transitory computer readable media of claim 1, wherein the first subset is one of a plurality of subsets of the plurality of instructions, and
   for each of the plurality of subsets the operations further comprise:
      receiving each of the plurality of subsets, wherein each of the plurality of subsets includes a plurality of subset instructions;
      for each instruction of the plurality of subset instructions that are addition or subtraction instructions:
         copying, to a first position in the first register, exponents from one operand of the addition or subtraction instruction; and
         copying, to a second position in the second register, exponents from another operand of the addition or subtraction instructions, the second position in the second register corresponding to the first position in the first register for each addition or subtraction instruction.

9. A method for detecting a potential floating-point error in an addition or a subtraction instruction included in an operation, the method comprising:
   identifying a first operand and a second operand, the first operand and the second operand configured to be manipulated during execution of an instruction;
   copying a first exponent of the first operand to a first comparison register;
   copying a second exponent of the second operand to a second comparison register;
   comparing the first exponent in the first comparison register to the second exponent in the second comparison register;
   based on the exponent comparison, determining whether the instruction, after execution, results in a potential floating-point error when the instruction is executed with the first operand and the second operand formatted according to a first precision;
   based on a result of the determination:
      executing the instruction with the first operand and the second operand formatted according to a second precision that is greater than the first precision in response to the determination that the instruction results in the potential floating-point error; and
      executing the instruction with the first operand and the second operand not formatted according to the second precision that is greater than the first precision in response to the determination that the instruction does not result in the potential floating-point error.

10. The method of claim 9, wherein comparing the first exponent to the second exponent comprises determining a difference between the first exponent and the second exponent.

11. The method of claim 10, further comprising defining a first threshold and a second threshold, wherein when the difference is less than the first threshold or greater than the second threshold, determining that the instruction includes the potential floating-point error.

12. The method of claim 11, wherein the first threshold and the second threshold are automatically set or set by a user.

13. The method of claim 9, wherein the first comparison register comprises a streaming single instruction multiple data extension (SSE) register, and the second comparison register comprises a SSE register.

14. A processing device comprising a processor that includes computer executable instructions configured to cause the processing device to perform the method of claim 9.

15. A non-transitory computer readable media including computer executable instructions configured to cause a processing device to perform operations to execute an addition or subtraction calculation, the operations comprising:
   defining a number of instructions within an original program that are included in a set of instructions that are analyzed in parallel by a secondary program configured to detect potential floating-point errors resulting from the execution of the set of instructions in the original program;
   detecting, by the secondary program, a potential floating-point error that would occur in the original program by execution of the number of instructions by comparing an exponent of a first operand to an exponent of a second operand in one or more addition or subtraction instructions in the set of instructions;
   in response to the exponent comparison being above a first preselected threshold or below a second preselected threshold, the first preselected threshold being greater than and separated from the second preselected threshold:
      formatting, by the secondary program, the first and second operands in a second precision higher than a first precision in which the first and second operands are executed in the original program;
      calculating, by the secondary program, a value by executing the set of instructions using the first and second operands formatted in the second precision;
      converting, by the secondary program, the value from the second precision to the first precision; and
      incorporating the value formatted in the first precision into the original program; and
   in response to the exponent comparison being below the first preselected threshold and above the second preselected threshold, calculating a value by executing the set of instructions using the first and second operands formatted in the first precision.

16. The non-transitory computer readable media of claim 15, wherein the first precision comprises 32-bit precision and the second precision comprises 64-bit precision.

17. The non-transitory computer readable media of claim 16, wherein detecting the potential floating-point errors comprises:
copying the exponents into comparison registries; and
performing a comparison operation between the comparison registries.

18. The non-transitory computer readable media of claim 15, wherein detecting the potential floating-point error involves less overhead than the overhead involved in executing the set of instructions using the first and second operands formatted in the second precision.

19. The non-transitory computer readable media of claim 15, wherein detecting the potential floating-point errors comprises a parallelized operation in which the exponents from a plurality of operands are compared independently using a single instruction.

20. The non-transitory computer readable media of claim 15, wherein the operations further comprise adjusting the number of instructions included in the set of instructions.

* * * * *